(12) United States Patent
Biskeborn

(10) Patent No.: US 7,952,882 B2
(45) Date of Patent: May 31, 2011

(54) ON DEMAND STORAGE ARRAY

(75) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 11/554,102

(22) Filed: Oct. 30, 2006

(65) Prior Publication Data

US 2008/0104280 A1   May 1, 2008

(51) Int. Cl.
*H05K 7/20* (2006.01)

(52) U.S. Cl. ............... 361/724; 361/679.33; 361/679.4; 369/30.43

(58) Field of Classification Search .................... 361/724
See application file for complete search history.

(56) References Cited

U.S. PATENT DOCUMENTS

| | | | |
|---|---|---|---|
| 5,148,432 A | 9/1992 | Gordon et al. | |
| 5,757,594 A * | 5/1998 | Dang et al. | 369/30.75 |
| 5,809,285 A | 9/1998 | Hilland | |
| 5,812,754 A | 9/1998 | Lui et al. | |
| 5,970,030 A | 10/1999 | Dimitri et al. | |
| 6,112,276 A | 8/2000 | Hunt et al. | |
| 6,327,519 B1 * | 12/2001 | Ostwald et al. | 700/245 |
| 6,512,962 B2 * | 1/2003 | Dimitri et al. | 700/214 |
| 6,600,703 B1 | 7/2003 | Emberty et al. | |
| 6,609,180 B2 | 8/2003 | Sanada et al. | |
| 6,650,601 B1 | 11/2003 | Emberty et al. | |
| 6,715,031 B2 | 3/2004 | Camble et al. | |
| 6,747,878 B1 * | 6/2004 | Hipp et al. | 361/801 |
| 6,865,640 B2 | 3/2005 | Dimitri et al. | |
| 6,885,911 B1 * | 4/2005 | Smith | 700/245 |
| 6,987,674 B2 * | 1/2006 | El-Batal et al. | 361/788 |
| 7,212,470 B2 * | 5/2007 | Dimitri et | 369/30.2 |
| 2002/0027742 A1 * | 3/2002 | Ostwald et al. | 360/92 |
| 2004/0054939 A1 | 3/2004 | Guha et al. | |
| 2004/0190216 A1 * | 9/2004 | Yip et al. | 361/234 |
| 2005/0057847 A1 * | 3/2005 | Armagost et al. | 360/92 |
| 2005/0057909 A1 * | 3/2005 | El-Batal et al. | 361/796 |
| 2008/0030945 A1 * | 2/2008 | Mojaver et al. | 361/685 |

* cited by examiner

*Primary Examiner* — Jayprakash N Gandhi
*Assistant Examiner* — Anthony Q Edwards
(74) *Attorney, Agent, or Firm* — Lieberman & Brandsdorfer, LLC

(57) ABSTRACT

A computer storage library is configured to include a plurality of storage media, with individual storage media housed in respective individual storage slots. Each of the storage media slots may communicate with a storage controller, which in turn may communicate with a host through a network connection. A delivery device is provided for enabling a connection between individual storage slots and a host via the controller on demand. The delivery device enables the storage media to remain stationary during the connection process.

20 Claims, 4 Drawing Sheets

ON DEMAND STORAGE ARRAY

BACKGROUND OF THE INVENTION

1. Technical Field

This invention relates to management of a data storage array. More specifically, the invention relates to a robotic arm employed with a data storage array to communicate with and control power delivery to the individual storage media in the data storage array.

2. Description of the Prior Art

Modern computer systems require large quantities of information storage. To meet this requirement computer data storage is available in many forms. A fast, but expensive and usually volatile form of data storage is main memory, typically including monolithic semiconductor circuits. Other available forms of data storage include magnetic direct access storage devices, magnetic tape storage devices, and optical recording devices. These types of data storage actually store data on electromagnetic or optical media. Each of these other types of data storage has a greater storage density and lower cost than main memory. However, these other devices require mechanical movement and therefore have slower data access times than purely electronic main memory.

Storing all system data in main memory is costly. However, storing all system data on one or more peripheral storage devices reduces performance. Thus, a typical computer system includes both main memory and one or more data storage devices arranged in a data storage hierarchy. In such a hierarchy, main memory is often referred to as the primary data storage. The next level of the hierarchy is known as secondary storage, etc. Generally, the highest level of the hierarchy has the highest performance and highest cost. Often at the lowest level of the hierarchy, the media is referred to as being removable, examples of which are tape and optical cartridges. By transferring data between different levels of the hierarchy, as required, cost and performance may be optimized.

In order to have the information available on an "as needed" basis, much storage at the lowest level of the hierarchy is required. Business applications typically use numerous portable data storage media including floppy disks, optical disks, or magnetic tapes, to meet the required data storage needs. Prior art data storage libraries have been developed to manage the storage of such portable disks or tapes. Some storage libraries employ automatic means including robotic picker and gripper devices to store and access such portable data storage media. Others do not employ automatic means, but rather rely on human operators to store and access conventional portable data storage media when needed.

Prior art data storage libraries include a plurality of storage bins or slots for retaining portable data storage media, such as magnetic tapes, magnetic disks, or optical disks. Each portable data storage medium may be contained in a cassette or cartridge housing for protection. In this regard, a drive unit having a portable data storage medium mounted therein and allocated for use is referred to as "unavailable." Conversely, a drive unit without a portable data storage medium mounted therein, or unallocated, is referred to as "available." Once a portable data storage medium is mounted in a drive unit, and the medium is allocated for use, data may be written to or read from that medium for as long as the system requires. Data is stored on a medium in the form of one or more files, with each file being a logical data set.

However, as noted above, there are limitations in the prior art configurations of data storage libraries. For example there may be a human factor that affects the efficiency of operation associated with storage of data on storage media located in the library. Therefore, there is a need to configure a storage library that mitigates or eliminates the degradation of performance associated therewith.

While many library configurations are possible, the storage media in a library is generally either static or picked. Static media remains in place and is accessed electrically, for example through a system of power lines and data cables which in turn may be operated in conjunction with relays and which are an integral part of the library infrastructure. This method of accessing is very costly and complex due to the large amount of wiring and electronics and due to the connectivity issues that arise in maintaining the networked status of the media blocks. Picked media is accessed robotically, removed from a slot and transported to a drive unit which then reads from or writes to the medium. This configuration has the disadvantages of slow data access and limited overall throughput due to the limited number of drives available for reading from and writing to the media.

Therefore, there is also a need to configure a storage library such that the media is neither picked nor permanently wired into an existing infrastructure.

SUMMARY OF THE INVENTION

This invention comprises a method and apparatus to manage a storage system housing a plurality of storage media.

In one aspect of the invention, a data storage system is provided with a plurality of storage media storage slots, a plurality of storage media removably disposed within the storage slot, and a storage controller in communication with said storage slots. A delivery device is provided to selectively complete an electrical connection between the storage controller and a select storage slot. The storage slot in communication with the storage controller remains stationary during completion of this electrical connection. Upon completion of the electrical connection, the delivery device controls delivery of power, I/O, and data communication, to an individual storage slot.

In another aspect of the invention, a method is provided for managing a data storage system. The storage system is configured with a plurality of storage media storage slots, a plurality of storage media removably disposed within the storage slots, and a storage controller in communication with the storage slots. An electrical connection between said storage controller and each one of said storage slots is controlled by issuing a communication instruction to a delivery device to complete an electrical connection between the storage controller and a select storage slot. The storage slot in communication with the storage controller remains stationary during completion of the electrical connection. Delivery of power, I/O, and data communication to an individual storage slot is controlled through the delivery device.

In yet another aspect of the invention, a computer system is provided with a processor in communication with a data storage system. The data storage system is configured with a plurality of storage media storage slots and a plurality of individual storage media. Each storage media is removably disposed within the storage slots. A delivery device is provided to control an electrical connection to each one of the individual storage media in communication with the storage slots. A computer readable medium is provided in the computer system. In the medium a first computer readable instruction is issued by the processor and delivered to the delivery device through the storage controller. The first instruction is a request to for the delivery device to complete an electrical connection between the storage controller and a select storage slot. The storage slot in communication with the storage controller remains stationary during completion of the instruction. A second computer readable instruction is provided and includes a request to control delivery of power, I/O, and data communication, to an individual storage media slot.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A storage library is configured to house a plurality of storage media. It is known in the art that not all of the storage media housed in the library will be reading and/or writing data all of the time. In order to conserve energy, it is desirable to remove power from slots housing the storage media that do not require operation, and to delivery power to slots housing storage media in which data is being read from or stored. A delivery device is provided that enables the storage media to remain in the assigned storage slots and for the storage slots to remain stationary. The delivery device is configured to complete an electrical connection between a select storage slot and a storage controller in communication with a processor requesting access to the associated storage media.

TECHNICAL DETAILS

Figure 1:
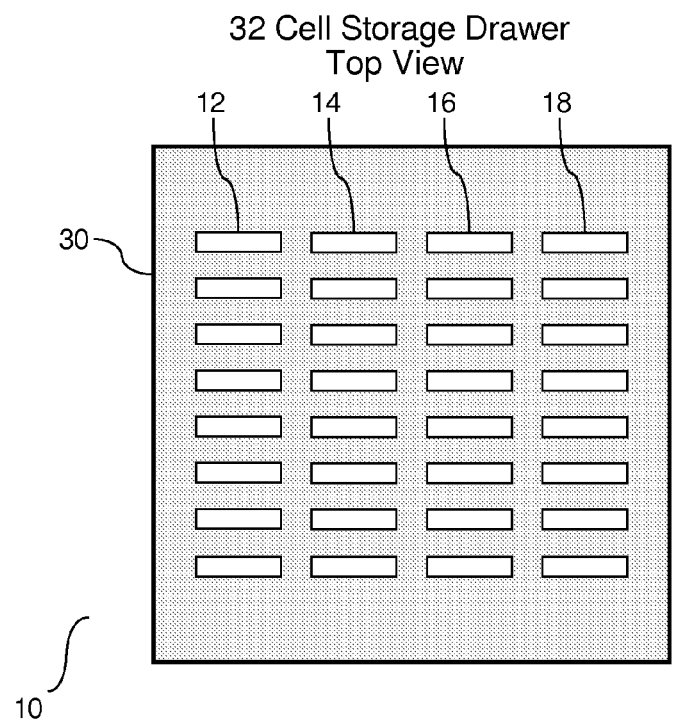
FIG. 1 is a block diagram of a top view of a storage library.

FIG. 1 is an illustration of one form of a storage library (10). As shown, the library comprises a plurality of storage slots arranged in rows and columns in the library, including storage slots (12), (14), (16), and (18). The example library shown in FIG. 1 includes thirty two separate storage slots. In one embodiment, the library may include fewer than thirty two slots, while in another embodiment; the library may include more than thirty two slots. The storage slots are shown arranged in communication with a main circuit board (30), also known as a motherboard. Each storage slot is configured to store individual storage media. In one embodiment, the storage media may be in the form of a hard disk drive, an optical disk drive, a solid state memory device, such as a flash memory module, a holographic drive, a flexible drive, etc. Similarly, in one embodiment, the individual storage media may be removably disposed within the storage slots. Each storage medium may be equipped with its own network interface, which typically consists of either proprietary circuitry for enabling connection to the network via category 5 or 6 Ethernet or optical cable, or of a dedicated processor and memory configured for running a network operating system, such as provided in Linux. In either case the motherboard may act as a network hub or switch which in turn presents a physical subnet consisting of up to a maximum of 32 individual storage media in this example to the storage controller in the library. Alternatively or additionally, network interfaces may reside on the motherboard, which has at least one such interface and preferably more than one so that multiple drives may be simultaneously accessed. In this case a network interface consists of a processor and memory configured for running a network operating system. In one embodiment, the library may include one circuit board, while in another embodiment; the library may include a plurality of circuit boards with each circuit board having an arrangement of storage slots configured to house individual storage media. The storage library is in communication with one or more host computers requesting storage of data and/or reading of data.

The circuit board (30) in communication with the storage slots and the associated storage media in communication with the storage slots may continuously receive power so that power to the circuit board is constant. Conversely, the storage media in communication with the associated storage slots do not continuously receive full power. By controlling delivery of power to the individual storage media, excess heat generated by operation of the storage media is mitigated, as well as noise byproduct associated with operation of the storage media.

The circuit board (30) configured to house the storage media is in communication with a controller (not shown). A delivery device (not shown) external to the circuit board (30) and the controller (not shown) is provided as a communication link between a processor and one or more select storage media. The delivery device (not shown) moves or translates within the storage library (10) housing the storage media. The delivery device is in communication with a host processor and delivers power to select storage slots on the circuit board (30) through an electrical connection, which is established upon arrival of the delivery device at a select storage slot. In one embodiment, the delivery device selects and captures a power cable (not shown) in communication with the storage controller and plugs the cable into a select port for a select storage device. The individual slots that house the storage media may be dormant when not active. By having the delivery device engage the select slot, the associated storage media receives power only during use. In one embodiment, the delivery device delivers I/O and data communication to the select storage slot(s).

Figure 2:
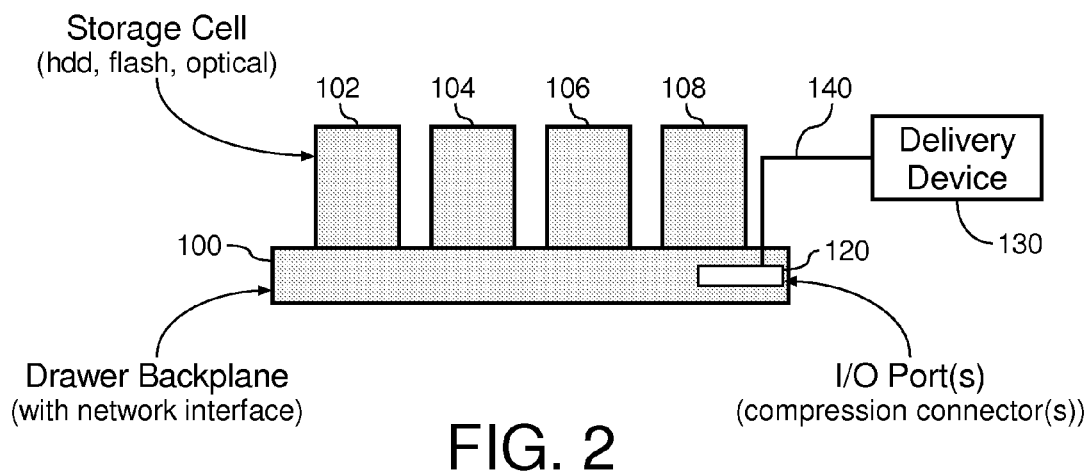
FIG. 2 is a front view of one drawer of a storage library and an associated storage controller.

FIG. 2 is a front view of one embodiment of a circuit board (100) with I/O port (120) on the front of the board (100). The circuit board (100) is shown configured with four rows (102), (104), (106), and (108) of storage media. Each row of storage media on the circuit board houses one or more columns for housing individual media. The I/O port (120) is an interface on the circuit board to which you can connect a device configured to transfer data to or from a storage controller or alternatively directly to or from a host computer and to or from storage media in communication with an associated storage slot. In one embodiment, the I/O on the front face of the circuit board includes a series of receptacles for receipt of a connector to each of the individual storage media and the delivery device is the connector. The delivery device (130) makes the connection between the controller or host and the I/O port. For example, upon receiving a communication from a host to access a specified storage device in communication with the circuit board (100), the delivery device (130) engages a cable (140) and places a first end of the cable in the I/O port (120). The other end of the cable is connected to a storage controller (not shown). In one embodiment, placement of the cable into the I/O port causes associated receptacle contacts to clamp onto the cable in the initial engagement. In this embodiment, the cable (140) may be in the form of a power over Ethernet standard in which direct current power is provided by the cable. Similarly, a signal may control delivery of power to the cable and conversely to the I/O connector after the free end of the cable is connected to the select storage slot. Once the connection to the storage slot is made, power is delivered to the slot and the associated storage media housed in the slot is powered up so it may operate, i.e. manipulate data, save data, or convey data to a requesting processor.

In the preceding example, the I/O port may connect directly to a particular storage medium. This is the method of operation for storage media having integrated network interfaces. In this method the delivery device may receive additional concurrent commands to connect cables to the I/O port. The I/O port thus is capable to accommodate more than one simultaneous connection. Alternatively, when the network interfaces reside on the motherboard, the delivery device connects a cable to the I/O port and provides the instruction, either mechanically or electrically, to power up a particular storage medium.

Figure 3:
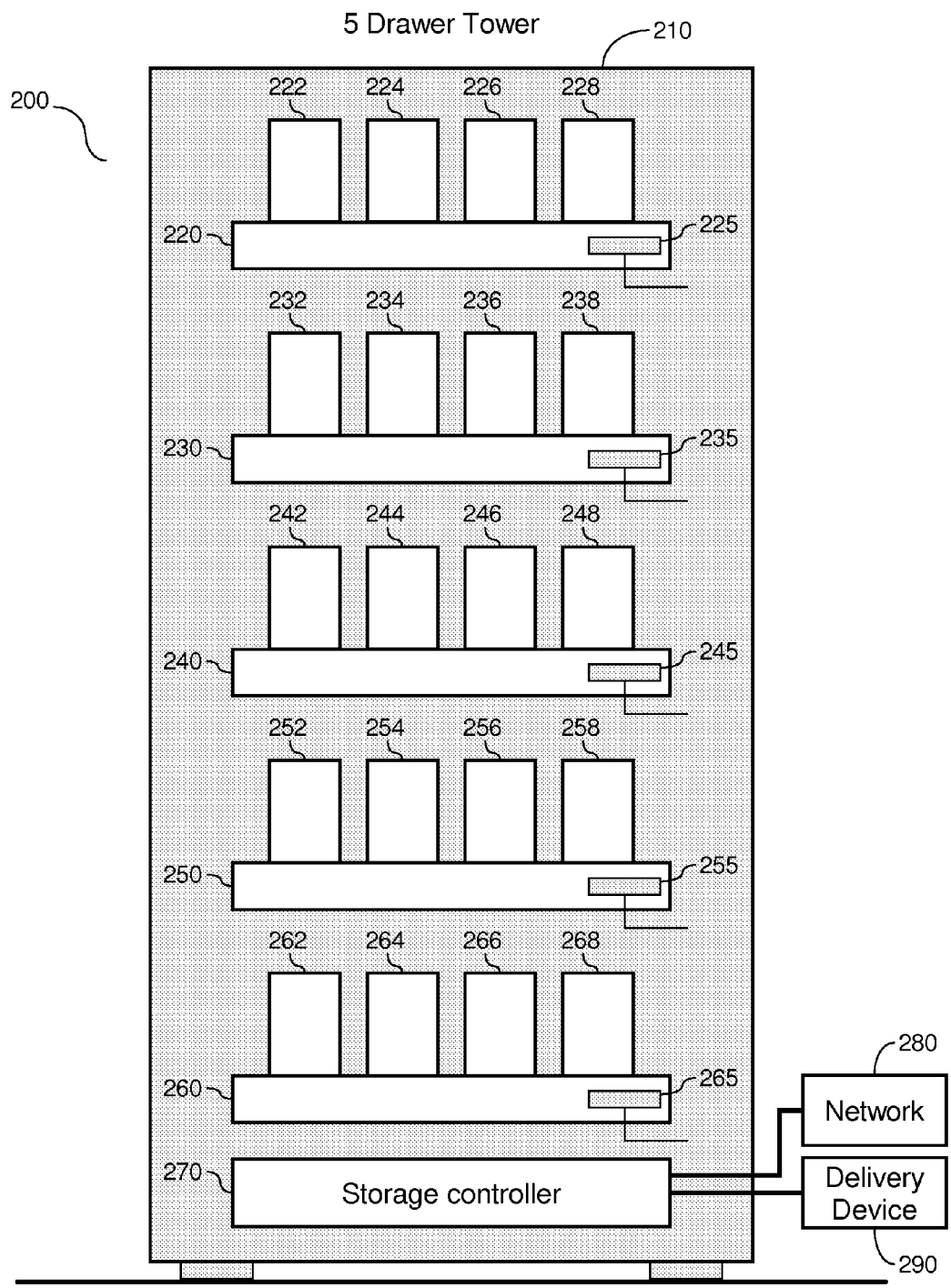
FIG. 3 is a block diagram of an expanded storage library.

FIG. 3 is a block diagram (200) of an expanded storage library (210). In this illustrating, there are five circuit boards (220), (230), (240), (250), and (260). Each circuit board has four rows of storage media. For example, circuit board (220), has rows (222), (224), (226), and (228), circuit board (230) has rows (232), (234), (236), and (238), circuit board (240) has rows (242), (244), (246), and (248), circuit board (250) has rows (252), (254), (256), and (258), and circuit board (260) has rows (262), (264), (266), and (268). Each circuit board has its own I/O port, and in one embodiment may have multiple ports. More specifically, circuit board (220) has I/O port (225), circuit board (230) has I/O port (235), circuit board (240) has I/O port (245), circuit board (250) has I/O port (255), and circuit board (260) has I/O port (265). Each of the circuit boards in the library (210) may be in communication with the storage controller (270), which is in communication with a computer network (280). In one embodiment, the computer network may be in the form of a local area network or a wide are network. The storage controller (270) receives commands to deliver or to or remove power and communication link from one or more specified storage devices in the library (210). A delivery device (290) is provided as a communication interface between the storage controller (270) and the circuit board (220)-(260) in the library (210). In the manner described above, the delivery device selectively communicates with the individual storage media through the associated I/O port of its circuit board.

Figure 4:
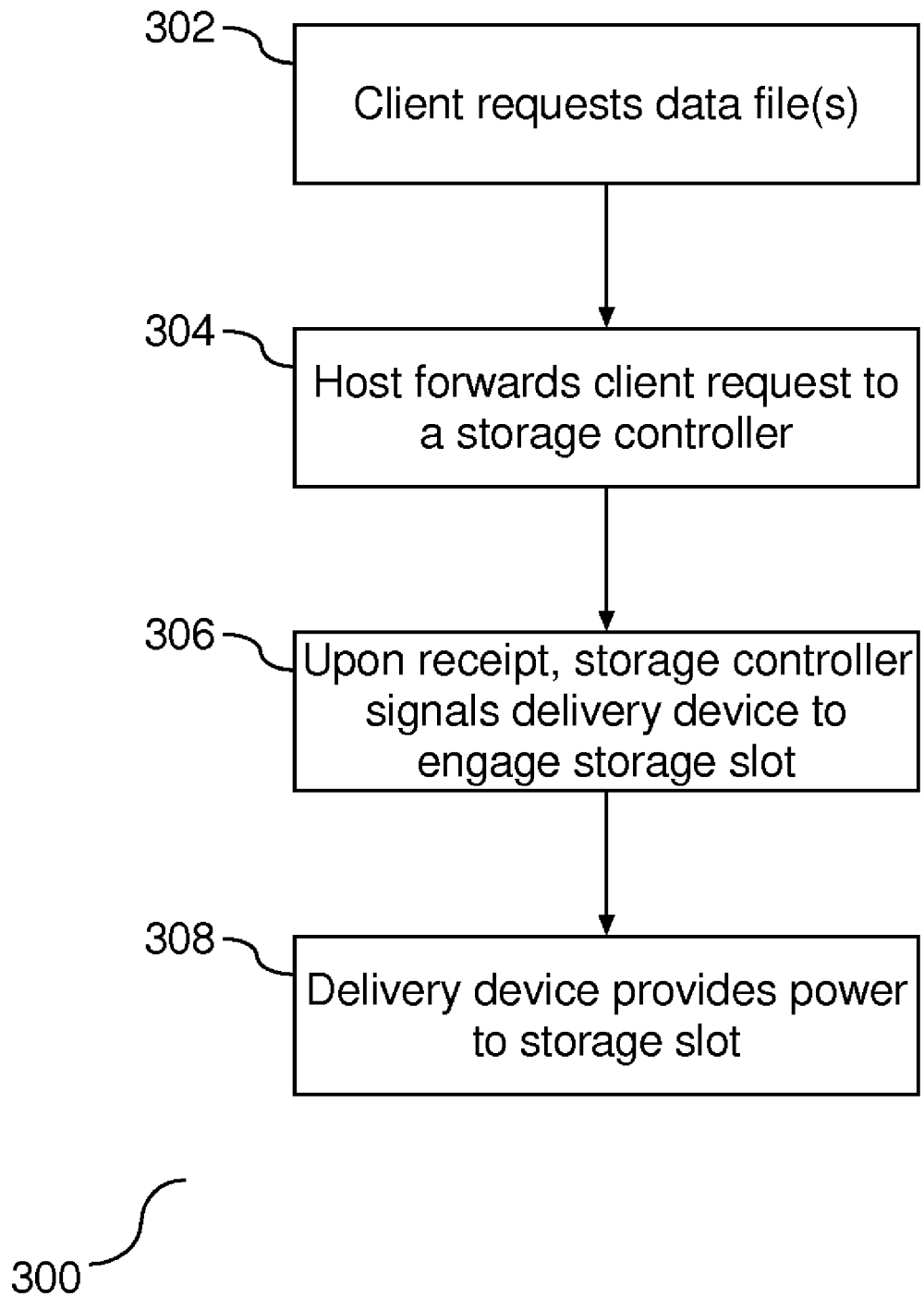
FIG. 4 is a flow diagram illustrating the flow of communication to and from the storage library.

FIG. 4 is a flow diagram (300) illustrating the flow of communication between storage media in a storage library and the source requesting the communication. Initially a client on a computer network in communication with the storage library requests one or more data files (302). A host computer in communication with the client through the network forwards the requests to a storage controller which is in communication with the delivery device and the storage media housing the requested file(s) (304). Upon receiving the request, the storage controller signals the delivery device to engage the requested storage slot(s) (306) and associated media residing therein to deliver network communication media, such as category 6 Ethernet cabling or optical fiber cabling, and power to the storage slot housing the requested storage media (308). In one embodiment, the delivery device may be a robotic arm such as is conventionally used for picking and transporting tape cartridges in a tape library. The process of having the delivery device make the requisite connections enables the storage slot and the associated storage media to remain stationary within the storage library. Since the delivery device provides the connections required for communications, the storage media does not move, i.e. it remains stationary. Furthermore, delivering the connections to the storage media on demand alleviates a need to have a large, complex, expensive and potentially unreliable wiring infrastructure for actively connecting to each and every storage media all the time.

Figure 5:
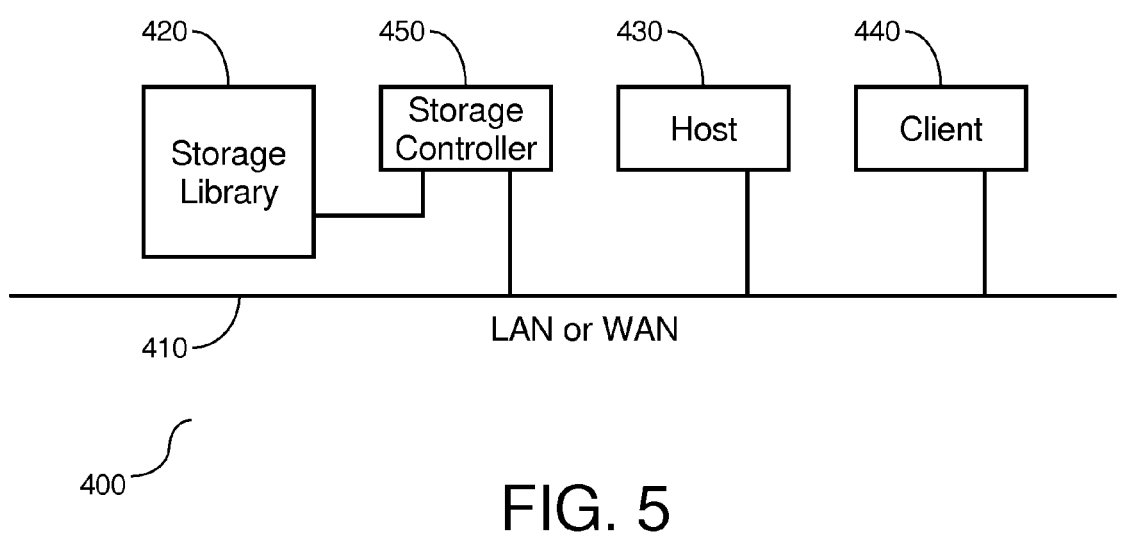
FIG. 5 is a block diagram of a computer network in communication with the storage library according to the preferred embodiment of this invention, and is suggested for printing on the first page of the issued patent.

FIG. 5 is a block diagram (400) of a computer network (410) in communication with a storage library (420). The computer network includes a host computer (430), a client (440), and a storage controller (450) all in communication across the network (410). In one embodiment, the network may be in the form of a local area network or a wide area network. The storage controller (450) is in communication with the storage library (420). The storage library may include a plurality of individual storage media housed in storage slots, with each storage slot in communication with the storage controller (450) through an associated circuit board and electrical connection. Similarly, in one embodiment, the storage media may include a plurality of circuit boards arranged in communication with the storage controller (450).

In one embodiment, the invention employs instructions implemented in software, which includes but is not limited to firmware, resident software, microcode, etc. The instructions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening private or public networks. Modems, wireless and Ethernet adapters are just a few of the currently available types of network adapters.

ADVANTAGES OVER THE PRIOR ART

The delivery device described herein does not physically handle the storage media. Rather, the delivery device provides a physical connection between the requested storage media and a storage controller. An existing library of storage media may be modified to operate with the delivery device and associated instructions. Since the storage media in the storage library are not powered on until requested, there is no associated problem of excess heat produced by a constant delivery of power to the storage media in the library. Accordingly, the delivery device is configured to selectively complete an electrical connection between a storage controller and requested storage media without physically moving the storage media.

Alternative Embodiments

It will be appreciated that, although specific embodiments of the invention have been described herein for purposes of illustration, various modifications may be made without departing from the spirit and scope of the invention. In particular, the connections themselves may be between copper conductors, as is accomplished using zero insertion force connectors and compression connectors, or they may be via optical interconnects, as for example are widely used in the electronics industry. Common examples of the latter are the high bandwidth pcm connections commonly found in consumer audio equipment. Accordingly, the scope of protection of this invention is limited only by the following claims and their equivalents.

I claim:

1. A data storage system comprising:
    a plurality of storage media storage slots in communication with a printed circuit board (PCB);
    a plurality of storage media removably disposed within said storage slots;
    a storage controller in communication with said storage slots;
    a delivery device to selectively complete an electrical connection between said storage controller and an I/O port of the (PCB) in communication with said storage media of a select storage slot to deliver power to said select storage slot in response to an I/O request for storage media in said select storage slot, wherein said delivery device controls delivery of: power, I/O, and data communication, to an individual storage slot in communication with said I/O port.

2. The system of claim 1, further comprising a communication connection between a host processor and one or more of said storage media slots formed by a robotic arm connection to said storage media.

3. The system of claim 1, further comprising a signal connection adapted to be actuated by said delivery device to control activation of individual storage media.

4. The system of claim 3, further comprising delivery power to said individual storage media by said electrical connection.

5. The system of claim 3, wherein said connection is an element selected from a group consisting of: a relay, a cable, a power of Ethernet cable, an optical cable, and combinations thereof.

6. The system of claim 1, wherein said storage media is selected from a group consisting of: a hard disk drive, a flash drive, an optical storage drive, a holographic drive, a flexible disk drive, and combinations thereof.

7. The system of claim 6, further comprising a plurality of storage media arranged on a shelf, and a plurality of shelves stacked to form a three dimensional array of storage media.

8. A method for managing a data storage system comprising:
    configuring said storage system with a plurality of storage media storage slots in communication with a printed circuit board (PCB), a plurality of storage media removably disposed within said storage slots, and a storage controller in communication with the storage slots; and
    controlling an electrical connection between said storage controller and each one of said storage slots, including, in response to an I/O request for storage media in a select storage slot, issuing communication instructions to a delivery device to complete an electrical connection between said storage controller and an I/O port of the PCB in communication with said storage media of the select storage slot to deliver power to said select storage slot; and
    controlling delivery of: power, I/O, and data communication, to an individual storage slot in communication with said I/O port through said delivery device.

9. The method of claim 8, further comprising forming a communication connection between a host processor and one or more of said storage media slots through connection of said delivery device to said storage media.

10. The method of claim 8, further comprising said delivery device actuating a signal connection to control activation of individual storage media.

11. The method of claim 10, further comprising delivering power to said individual storage media by said electrical connection.

12. The method of claim 10, wherein said connection is an element selected from a group consisting of: a relay, a cable, a power of Ethernet cable, an optical cable, and combinations thereof.

13. The method of claim 8, wherein said storage media is selected from a group consisting of: a hard disk drive, a flash drive, an optical storage drive, a holographic drive, a flexible disk drive, and combinations thereof.

14. The method of claim 8, further arranging a plurality of storage media on a shelf, and stacking a plurality of shelves to form a three dimensional array of storage media.

15. A computer system comprising:
    a processor in communication with a data storage system;
    said data storage system having a plurality of storage media storage slots in communication with a printed circuit board (PCB) and with individual storage media removably disposed within individual storage slots;
    a delivery device to control an electrical connection to each one of said storage media in communication with said storage slots;
    a computer readable medium with a computer readable instruction issued by said processor and delivered to said delivery device through said storage controller in response to an I/O request for storage media in a select storage slot, said delivery device to complete an electrical connection between said storage controller and an I/O port of the PCB in communication with said storage media of the select storage slot in response to said instruction to deliver power to said select storage slot; and a second computer readable instruction to control delivery of: power, I/O, and data communication, to an individual storage media slot in communication with said I/O port.

16. The system of claim 15, further comprising a signal connection adapted to be actuated by said delivery device to control activation of individual storage media.

17. The system of claim 16, further comprising delivery of power to said individual storage media by said electrical connection.

18. The system of claim 15, wherein said connection is an element selected from a group consisting of: a relay, a cable, a power of Ethernet cable, an optical cable, and combinations thereof.

19. The system of claim 15, wherein said storage media is selected from a group consisting of: a hard disk drive, a flash drive, an optical storage drive, a holographic drive, a flexible disk drive, and combinations thereof.

20. The method of claim 15, further comprising said delivery device powering said select storage slot off upon completion of said I/O request.

* * * * *